United States Patent
Schreiber et al.

(10) Patent No.: US 8,972,062 B2
(45) Date of Patent: Mar. 3, 2015

(54) METHOD FOR MOUNTING COMPONENTS BY MEANS OF AN INDUSTRIAL ROBOT

(75) Inventors: Gunter Schreiber, Friedberg (DE); Michael Gerung, Augsburg (DE)

(73) Assignee: KUKA Laboratories GmbH, Augsburg (DE)

( * ) Notice: Subject to any disclaimer, the term of this patent is extended or adjusted under 35 U.S.C. 154(b) by 240 days.

(21) Appl. No.: 13/583,317

(22) PCT Filed: Mar. 3, 2011

(86) PCT No.: PCT/EP2011/053153
§ 371 (c)(1),
(2), (4) Date: Sep. 7, 2012

(87) PCT Pub. No.: WO2011/110463
PCT Pub. Date: Sep. 15, 2011

(65) Prior Publication Data
US 2012/0330463 A1 Dec. 27, 2012

(30) Foreign Application Priority Data
Mar. 9, 2010 (DE) .................. 10 2010 010 718

(51) Int. Cl.
*G06F 19/00* (2011.01)
*B25J 9/16* (2006.01)

(52) U.S. Cl.
USPC ........................................... 700/260

(58) Field of Classification Search
USPC ........ 700/245, 63, 275, 260, 262; 318/568.13
See application file for complete search history.

(56) References Cited

U.S. PATENT DOCUMENTS

| | | | |
|---|---|---|---|
| 4,791,588 A | 12/1988 | Onda et al. | |
| 4,842,475 A | 6/1989 | Driels | |
| 5,206,930 A | 4/1993 | Ishikawa et al. | |
| 6,212,443 B1 * | 4/2001 | Nagata et al. | 700/245 |

(Continued)

FOREIGN PATENT DOCUMENTS

| | | |
|---|---|---|
| DE | 10 2009 038 275 A1 | 3/2010 |
| EP | 1405690 A1 | 4/2004 |

(Continued)

OTHER PUBLICATIONS

European Patent Office; Search Report in International Patent Application No. PCT/EP2011/053153 dated Jul. 5, 2011; 6 pages.

(Continued)

*Primary Examiner* — Ronnie Mancho
(74) *Attorney, Agent, or Firm* — Wood, Herron & Evans, LLP

(57) ABSTRACT

The invention relates to a method for mounting a component, which comprises an insertion part and a holding part, in an opening in a workpiece by means of an industrial robot, which has an end effector, which guides the component on the holding part thereof. The method according to the invention is implemented by causing the insertion part of the component to approach the opening by moving the industrial robot; increasing the process forces by means of the industrial robot, once the insertion part of the component has made contact with the workpiece, until a process force threshold is reached, wherein the process forces are stored particularly in the form of material stresses; increasing the flexibility of the industrial robot when the process force threshold is reached; and executing a passive centering movement of the industrial robot based upon the process forces that are released by a relaxation of the material.

11 Claims, 2 Drawing Sheets

(56) References Cited

U.S. PATENT DOCUMENTS

Figure 1:
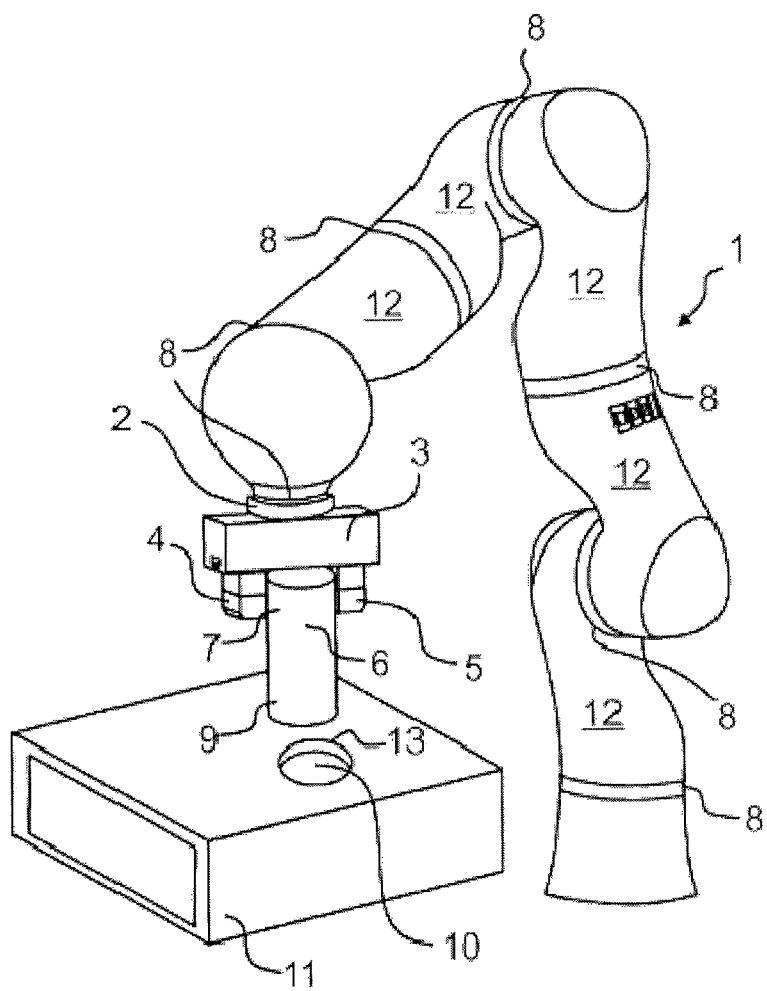

| | | | |
|---|---|---|---|
| 6,278,903 B1* | 8/2001 | Iwasaki et al. | 700/245 |
| 6,294,890 B1 | 9/2001 | Shimada et al. | |
| 6,816,755 B2* | 11/2004 | Habibi et al. | 700/259 |
| 8,121,732 B2* | 2/2012 | Hashimoto et al. | 700/260 |
| 8,175,750 B2* | 5/2012 | Tsusaka | 700/257 |
| 8,457,791 B2* | 6/2013 | Shi | 700/258 |
| 2004/0144759 A1* | 7/2004 | Cho et al. | 219/86.7 |
| 2007/0210740 A1 | 9/2007 | Sato et al. | |
| 2007/0231063 A1* | 10/2007 | Tsutsumi et al. | 403/322.2 |

FOREIGN PATENT DOCUMENTS

| | | |
|---|---|---|
| EP | 1422020 A1 | 5/2004 |
| EP | 2011610 A2 | 1/2009 |
| JP | 04-348885 | 12/1992 |
| JP | 07-088730 | 4/1995 |

OTHER PUBLICATIONS

German Patent Office; Search Report in German Patent No. 10 2010 010 718.2 dated Mar. 18, 2010; 4 pages.

Kraus et al.; IEEE International Conference on Robotics and Automation Proceedings; Force Fields in the Manipulation of Flexible Materials; Apr. 1996; 5 pages.

Goto et al.; IEEE Transactions on Systems, Man, and Cybernetics; Control Algorithm for Precision Insert Operation Robots; Jan. 1980; 7 pages.

Kraus et al.; IEEE International Conference on Robotics and Automation Proceedings; Case Studies in the Manipulation of Flexible Parts Using a Hybrid Position/Force Approach; Apr. 1997; 6 pages.

* cited by examiner

METHOD FOR MOUNTING COMPONENTS BY MEANS OF AN INDUSTRIAL ROBOT

The invention relates to a method for mounting a component, which comprises an insertion part and a holding part, in an opening in a workpiece by means of an industrial robot, which has an end effector, which guides the component on the holding part thereof.

EP 1 405 690 A1 describes an industrial robot and a method for mounting a valve in a borehole intended for this purpose in a wheel rim of motor vehicles. To ensure that the valve is mounted in the correct position in the borehole, a camera system is provided, which determines the precise position of the borehole on the wheel rim and transmits said position to a control system, which is connected to the industrial robot for the control thereof.

JP 07-088730 A describes a mounting cell having two industrial robots. An instrument panel of a motor vehicle forms a workpiece, which has an opening in which a component will be mounted. For this purpose, the instrument panel is equipped with markings. One of the two industrial robots supports a camera system, intended for photographing the opening and the markings on the instrument panel. From the positions of the opening and the markings photographed by the camera system, a mounting position and mounting orientation for the component are determined, and the other industrial robot, which holds the component, is actuated accordingly to orient the component in the correct position in relation to the workpiece for the mounting of said component.

JP 04-348885 A describes a method for inserting a component into an opening in a workpiece, in which the component is made to approach the opening, moved by a robot. When the component is located at an edge of the opening in the workpiece, the component is rotated by the robot, and a change in contact force is recorded and stored. On the basis of the change in contact force, a direction of movement in which the robot is moving the component is determined, to allow said component to be inserted into the opening in the correct position.

The problem addressed by the invention is that of specifying an improved method for mounting a component in an opening in a workpiece.

The problem addressed by the invention is solved by a method for mounting a component, which comprises an insertion part and a holding part, in an opening in a workpiece by means of an industrial robot, which has an end effector, which guides the component on the holding part, comprising the following steps:
  causing the insertion part of the component to approach the opening by moving the industrial robot;
  increasing the process forces by means of the industrial robot once the insertion part of the component has made contact with the workpiece, until a process force threshold is reached, wherein the process forces are stored particularly in the form of material stresses;
  increasing the flexibility of the industrial robot when the process force threshold is reached; and
  executing a passive centering movement of the industrial robot based upon the process forces that are released by a relaxation of the material.

The component can particularly be a rubbery elastic component. For example, the component can comprise elastomers, rubbers, i.e., vulcanized natural rubber, rubber and/or silicone rubber. The component can also contain additional materials, such as metals, for example, which also possess elastic properties to a certain degree. If the component itself, in other words inherently, has elastic properties, then the process forces can be stored in the component in the form of material stresses. Alternatively or additionally, the process forces can be stored in the form of material stresses in spring-elastic elements and/or in a spring-elastic end effector of the industrial robot, and/or can be reproduced by a force- or momentum-controlled operation of the industrial robot.

Process forces are understood particularly as those contact forces that develop between the component and the workpiece when the industrial robot brings the component into contact with the workpiece.

The process force threshold represents a maximum force which, when reached, causes a measure of process forces to be stored, particularly in the form of material stresses, in the elastic component, in the spring-elastic element and/or in the spring-elastic end effector of the industrial robot, and/or to be reproduced by a force- or momentum-controlled operation of the industrial robot, said measure of process forces being sufficient to cause the industrial robot to execute a passive centering movement when its flexibility is increased.

Flexibility, i.e., flexibility control, of the industrial robot can be achieved particularly by means of impedance control rather than admittance control.

Admittance control is based upon an existing position control of the industrial robot at the level of the articulated joints. In this case, the generalized forces acting externally on the industrial robot must be measured. Based upon these forces, a movement of the industrial robot that corresponds to the desired dynamic behavior is determined, and a command for said behavior is implemented in the industrial robot via an inverse kinematic method and the process position control.

Impedance control, in contrast to admittance control, is based upon an existing torque control at the articulated joint level. The deviation in the actual position from a defined, target position is measured and, based upon the desired dynamic behavior, a desired generalized force, or forces and moments, are determined. This force can be mapped onto corresponding joint torques via the known kinematic of the industrial robot. Finally, the torques can be set by means of the process torque control.

A desired Cartesian behavior can be achieved on the basis of a process position, torque or joint impedance control. These controls can be implemented by integrating momentum sensor technology into the joints of an industrial robot. In this case, the sensor detects the one-dimensional torque acting at the output of a transmission. This variable can be applied as a parameter for control, and therefore allows the flexibility of the joints to be taken into consideration within the framework of control. More particularly, when a torque sensor system is used, rather than using a force momentum sensor on the end effector, those forces are also measured that are exerted not on the end effector but on the elements of the industrial robot and/or on a component that is held by the industrial robot.

In other words, the feature of an increase in flexibility can be understood as an increase in the affinity of the industrial robot for diminishing or nullifying disruptive forces acting on it externally.

The concept of a passive centering movement can be understood as any movement executed by the industrial robot as a result of the action of an external force, without the joints of the industrial robot being driven for the active movement thereof.

The opening can particularly be a continuous borehole, a blind hole in the workpiece, or a perforation in the workpiece. The opening can be circular in shape. However, the opening can also have other contours. More particularly, the opening can have a very basic shape, particularly a concave shape. For example, the contour of the opening can be oval or elliptical in shape, rather than circular.

The flexibility of the industrial robot can be increased by a discontinuous change in flexibility. Therefore, the flexibility can be increased within a very short time interval, and the passive movement of the industrial robot can be carried out with suitably high accelerations. On the basis of frictional effects, for example, energy losses are diminished, so that these energies that are released are available for the passive movement of the industrial robot.

The discontinuous change in flexibility from an initial flexibility level to a final flexibility level can take place within a time window of between 100 microseconds and 12 seconds. A time window of 1 millisecond has proven particularly advantageous.

In all embodiments according to the invention, the flexibility of the industrial robot can be increased by a discontinuous change in a control parameter of the control circuit, particularly by setting a multiplication factor to zero, which is acting to increase the process forces.

Moreover, the flexibility of the industrial robot can also be increased by switching the industrial robot from position-controlled operation to force- and/or momentum-controlled operation. In other words, a change in the control principle and/or in the robot properties can be implemented, specifically from admittance control to impedance control. This switch can particularly be carried out abruptly, i.e., as rapidly as possible.

According to the invention, the process forces can be stored in the form of material stresses in the component. Alternatively or additionally, the process forces can be stored in the form of material stresses in the workpiece. Alternatively or additionally, the process forces can also be stored in the form of material stresses in a spring-elastic element and/or a spring-elastic end effector of the industrial robot. Rather than actual storage in a spring-elastic element and/or a spring-elastic end effector of the industrial robot, a spring stiffness of the industrial robot can also be reproduced by a force- and/or momentum-controlled operation of the industrial robot.

A modification of the method according to the invention provides for a repeat of the steps of one of the described methods when the actual position of the component with respect to the opening in the workpiece deviates from a target position of the component with respect to the opening in the workpiece by more than a predetermined tolerance value. In other words, the method according to the invention is optionally repeated until the component can be inserted into the opening in the workpiece. In other words, it is optionally switched back and forth multiple times between position-controlled operation and force- or momentum-controlled operation.

In all embodiments according to the invention, at least the insertion part of the component can be embodied as circular in cross-section, the opening being a circular opening, so that the passive centering movement of the industrial robot is executed precisely in the direction of the center.

Therefore, depending on the embodiment of the invention, a method is provided, with which a component can be inserted into an opening in a workpiece, without requiring costly sensor technology for determining and/or measuring the position of the opening. Moreover, no special programming of the control device of the industrial robot is required for actively tracking the position of the opening in the workpiece.

One application example from the field of automotive manufacturing involves molded rubber parts, such as plugs, for example, which are to be inserted automatically into a still untreated body shell of a motor vehicle, to allow the body shell to be painted with the hollow cavities thereof sealed. Particularly on the underside of the body shell, this mounting task is one that has previously been difficult to perform manually, and can therefore be automated using an industrial robot.

The method according to the invention particularly involves a special strategy for finding the center of an opening, particularly the center of a hole of a circular opening.

In the case of joining, one problem consists in that, as a result of component tolerances of the workpiece, such as a body-in-white and feed-in units on the production belt, for example, the insertion position is not precisely known. Therefore, it has heretofore been necessary for the industrial robot to perform a reference feed, in order to precisely determine the hole known from the idealized model. Only after said reference feed can the actual joining process begin. Such a reference feed requires time, i.e., cycle time. The problem addressed by the invention is that of minimizing the reference feed time, at least for a certain class of technically relevant components. More particularly, the properties of the components, which have their own spring stiffness, such as rubber, for example, are to be expediently utilized.

So-called lightweight robots are equipped with various types of control operations. These are used in the joining process. In a reference feed phase, for example, the robot, while gripping the component, approaches the ideally known hole until it senses contact pressure. During this reference feed, the robot is switched to rigid, i.e., it is operated under position control. As soon as the robot senses a counterforce, the robot is abruptly switched to non-rigid, i.e., it is operated under force-/momentum control. In the case of the lightweight robot of the KUKA LBR III type, said switch can be triggered by the command "TRIG_BY_CONTACT".

In the moment that the switch is made from position-controlled operation to force-/momentum-controlled operation, the component forces the robot away by virtue of its own spring stiffness, as the spring of the component is released. In this case, the spring stiffness of the robot can be chosen as suitably low.

However, in the case of openings and/or concave contours, such as circular boreholes, for example, the component always pushes the robot away in the direction of the center or the circle center point. Therefore, once the robot has been pushed away, it is in a more favorable insertion position, allowing the component to be inserted with a minimum of effort.

Therefore, according to the invention, a particularly abrupt switch in rigidities is carried out as soon as a counterforce from the joining process can be sensed in the robot joints or at the end effector. In this case, the component itself is used as a spring and an energy store, for supporting the joining process.

An accurate insertion of components into openings in workpieces can therefore be carried out utilizing elasticities, specifically elasticities that are present in the form of material properties of the surrounding area, material properties of the component to be joined, properties of the robot, such as torque sensors, and end effector properties, and/or elasticities that occur virtually in the control system in the form of a control principle.

One aspect of the invention is the discontinuous or abrupt change in the properties of the robot or in the control principle, wherein the energies stored in the elasticities are released. The released energies induce process forces that can be utilized positively with respect to process stability and a reduction in the cycle time. In general, the restoring force, particularly in the case of circular components and/or openings or at least convex components and/or concave openings, acts in the correct direction, i.e., toward the center, to properly align the component to be joined.

Therefore, the component always pushes the robot away in the direction of the circle center point. The robot is then in a favorable insertion position for inserting the component with minimal reference feed time.

With a suitable selection of the rigidity parameters for the robot, the restoring force component can therefore be used passively to substantially accelerate the reference feed process. The effect that is utilized is based, as described above, on the spring-type stresses that are stored in the material. Moreover, the robot itself represents a programmable, i.e., virtual, spring, which can be abruptly released. During the release process, the robot is forced by the component itself into an advantageous position.

The method is not limited to placing plugs in bodies-in-white, and can instead be expanded to include all molded parts that have their own significant spring constant, i.e., material stiffness. The shape of the opening hole in the workpiece, for example a circle or an ellipse, advantageously supports the effect, but also is not the sole limiting factor, i.e., other classes of shapes can also be processed using the method.

In principle, the existing, i.e., true elasticities of the surrounding area and of the robot and the virtual elasticities are used as energy stores. For this purpose, the robot is switched to rigid at the start. This can be implemented in the form of a described position control. The robot is then moved to the point of contact pressure, i.e., the component is brought into contact with the opening in the workpiece, and the existing spring energy stores are loaded. A robot command, such as the command "TRIG_BY_CONTACT" of the lightweight KUKA LBR III type robot, then ensures that, when a threshold force is exceeded, the robot is abruptly switched to non-rigid. The energy, particularly potential energy, which is present in the overall system, can thereby be abruptly released.

With all joining processes and mounting processes of this type, the force that is released can a direction that supports the process, as described in the above example of circular objects. Ordinarily, it is necessary to implement such a sequence only once. However, the sequence can be repeated as necessary.

However, the energy storage effect can also be implemented by means of a passive spring element in the end effector, e.g., in the gripper, or as an intermediate piece between flange and gripper. The same program sequence as has been described above can be implemented in an embodiment of this type.

With the joining of rigid components, such as metal pins in metal holes, the required spring stiffness can also come from the robot itself, i.e., by a mechanical stressing of the robot elements, or the required spring stiffness can even be generated virtually, if the surrounding stiffness is insufficient.

A method according to the invention is described by way of example in reference to the attached set of drawings. The drawings show:

FIG. 1 an industrial robot with end effector during a mounting process; and

Figure 2:
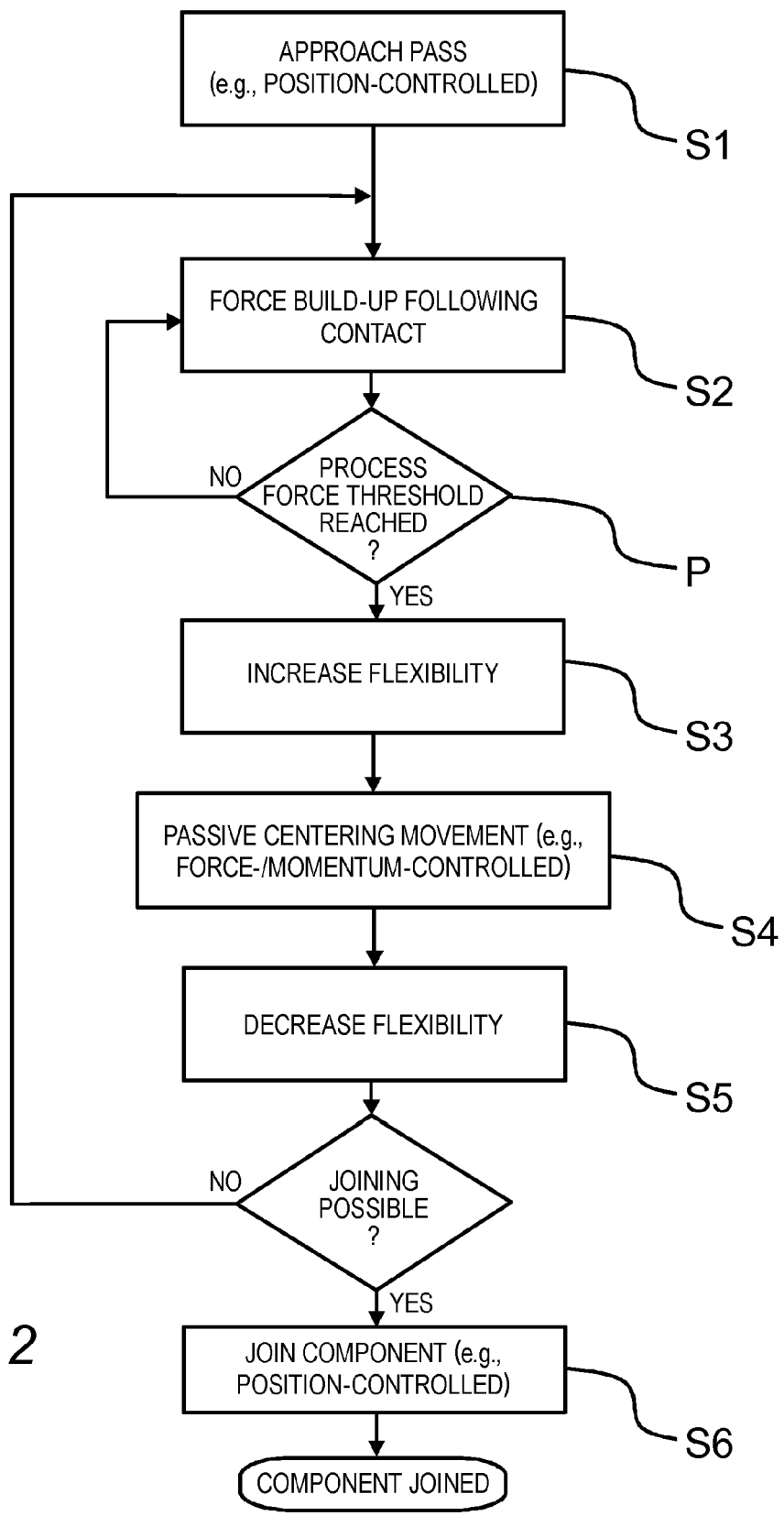

FIG. 2 a sequence diagram as an example of a method according to the invention.

FIG. 1 shows an industrial robot 1. The illustrated embodiment example according to the invention involves, by way of example, a lightweight robot of the KUKA LBR III type. On its hand flange 2, the industrial robot 1 has an end effector 3. The end effector 3 can also be called a gripper. The illustrated end effector 3 has two gripper jaws 4 and 5 that can be moved relative to one another. Between the gripper jaws 4 and 5, a component 6 is held on a holding part 7 of the component. The industrial robot 1 has elements 12, which are connected to one another via articulated joints 8. By moving the articulated joints 8 of the industrial robot 1, the end effector 3 and the component 6 are moved. In addition to the holding part 7, the component 6 has an insertion part 9. Applying the method according to the invention, the insertion part 9 of the component 6 is to be inserted into an opening 10 in a workpiece 11 by means of the industrial robot 1.

In FIG. 2, one embodiment of a method according to the invention is schematically illustrated. In a first step S1 involving an approach pass, the insertion part 9 of the component 6 is made to approach the opening 10 by moving the industrial robot 1. The approach can be carried out by a position-controlled operation of the industrial robot 1.

In a second step S2, once the component 6 or the insertion part 9 has made contact with the workpiece 11 or with an edge 13 of the opening 10, process forces are increased by means of the industrial robot 1, after the insertion part 9 of the component 6 has made contact with the workpiece 11, until a process force threshold P is reached. The process forces are stored particularly in the form of material stresses in the component 6, the end effector 3, and/or the industrial robot 1.

Once the process force threshold is reached, or when the process force threshold P has been exceeded, the flexibility of the industrial robot 1 is increased in a third step S3. The flexibility of the industrial robot 1 can be increased by a discontinuous change in flexibility.

The change in flexibility can be a switch from position-controlled operation to a force-/momentum-controlled operation of the industrial robot 1.

Once the flexibility of the industrial robot 1 has been increased or the industrial robot 1 has been switched from position-controlled operation to a force-/momentum-controlled operation, the industrial robot 1 executes a passive centering movement, in a fourth step S4, based upon the process forces that are released by a relaxation of the material. In other words, the industrial robot 1 is not actively moved by an actuation of drives of the articulated joints 8, and instead, the industrial robot 1 is passively pushed away by the process forces that are released by a relaxation of the material, i.e., particularly by external forces acting on the structure of the industrial robot 1. In one variation of the invention, a passive centering movement is implemented by a release of material stresses of the robot structure, in other words, on the basis of internal forces of the industrial robot 1 and/or on the basis of a spring stiffness of the industrial robot 1, which is reproduced by a force- and/or momentum-controlled operation of the industrial robot 1.

In an optional additional step S5, once the component 6 has been centered with respect to the opening 10 in the workpiece 11, the flexibility of the industrial robot 1 can be decreased again or can be switched from a force- and/or momentum-controlled operation of the industrial robot 1 back to a position-controlled operation. If a joining of the insertion part 9 of the component 6 in the opening 10 is possible in a step S6, the component 6 is finally mounted and the mounting process is completed.

If a joining of the insertion part 9 of the component 6 in the opening 10 is not yet possible, then steps S2 to S5 of one of the embodiments of the method according to the invention can be repeated and/or varied once or optionally multiple times.

More particularly, if the actual position of the component 6 with respect to the opening 10 in the workpiece 11 deviates from a target position of the component 6 with respect to the opening 10 in the workpiece 11 by more than a preset tolerance level, steps S2 to S5 of the method can be repeated.

At least the insertion part 9 of the component 6 can be embodied as circular in cross-section, or the opening 10 can be a circular opening, so that the passive centering movement of the industrial robot 1 is executed precisely in the direction of the center.

The invention claimed is:

1. A method for mounting a component, which comprises an insertion part and a holding part, in an opening in a workpiece by means of an industrial robot, which has an end effector, which guides the component on the holding part, comprising the following steps:
   causing the insertion part of the component to approach the opening by moving the industrial robot;
   increasing process forces by means of the industrial robot once the insertion part of the component has made contact with the workpiece, until a process force threshold is reached, wherein the process forces are particularly stored in the form of material stresses;
   increasing the flexibility of the industrial robot when the process force threshold is reached; and
   executing a passive centering movement of the industrial robot based upon the process forces that are released by a relaxation of the material.

2. The method according to claim 1, in which the flexibility of the industrial robot is increased by a discontinuous change in flexibility.

3. The method according to claim 2, in which the discontinuous change in flexibility from an initial flexibility level to a final flexibility level takes place within a time window of between 100 microseconds and 12 milliseconds, particularly 1 millisecond.

4. The method according to claim 1, in which the flexibility of the industrial robot is increased by a discontinuous change in a control parameter of the control circuit, particularly setting a multiplication factor to zero, which is acting to increase the process forces.

5. The method according to claim 1, in which the flexibility of the industrial robot is increased by switching the industrial robot from a position-controlled operation to a force- and/or momentum-controlled operation.

6. The method according to claim 1, in which the process forces are stored in the form of material stresses in the component and/or in the workpiece.

7. The method according to claim 1, in which the process forces are stored in the form of material stresses in a spring-elastic element of the industrial robot.

8. The method according to claim 1, in which the process forces are stored in the form of material stresses in a spring-elastic element and/or in a spring-elastic end effector of the industrial robot.

9. The method according to claim 1, in which the process forces are stored by a reproduction of a spring stiffness of the industrial robot by a force- and/or momentum-controlled operation of the industrial robot.

10. The method according to claim 1, comprising the following additional step:
    repeating the steps of the method according to claim 1 when the actual position of the component with respect to the opening in the workpiece deviates from a target position of the component with respect to the opening in the workpiece by more than a predefined tolerance value.

11. The method according to claim 1, in which at least the insertion part of the component is embodied as circular in cross-section and the opening is a circular opening, so that the passive centering movement of the industrial robot is executed in the direction of the center.

* * * * *